United States Patent
Oh

(10) Patent No.: US 8,654,237 B2
(45) Date of Patent: Feb. 18, 2014

(54) DIGITAL PHOTOGRAPHING APPARATUS, METHOD FOR CONTROLLING THE SAME, AND RECORDING MEDIUM STORING PROGRAM TO EXECUTE THE METHOD

(75) Inventor: Hae-sung Oh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 467 days.

(21) Appl. No.: 12/947,929

(22) Filed: Nov. 17, 2010

(65) Prior Publication Data

US 2011/0115925 A1    May 19, 2011

(30) Foreign Application Priority Data

Nov. 19, 2009    (KR) .................. 10-2009-0112185

(51) Int. Cl.
*H04N 5/222* (2006.01)
(52) U.S. Cl.
USPC ................................. 348/333.03; 348/333.12
(58) Field of Classification Search
USPC ............................ 348/333.01, 333.03, 333.12
See application file for complete search history.

(56) References Cited

U.S. PATENT DOCUMENTS

| | | | | |
|---|---|---|---|---|
| 5,751,354 | A * | 5/1998 | Suzuki et al. | 348/349 |
| 7,034,881 | B1 * | 4/2006 | Hyodo et al. | 348/333.12 |
| 7,110,040 | B1 * | 9/2006 | Misawa | 348/373 |
| 8,203,640 | B2 * | 6/2012 | Kim et al. | 348/333.12 |
| 8,237,807 | B2 * | 8/2012 | Jones et al. | 348/221.1 |
| 2001/0020978 | A1 * | 9/2001 | Matsui et al. | 348/222 |
| 2007/0097246 | A1 * | 5/2007 | Adams | 348/333.01 |
| 2009/0256947 | A1 * | 10/2009 | Ciurea et al. | 348/333.12 |
| 2010/0156941 | A1 * | 6/2010 | Seung | 345/660 |

OTHER PUBLICATIONS

Operating Instructions for Panasonic DMC-FX500 digital camera; copyright 2008. 140 pages.*

* cited by examiner

*Primary Examiner* — Daniel M Pasiewicz
(74) *Attorney, Agent, or Firm* — Drinker Biddle & Reath LLP

(57) ABSTRACT

A method of controlling a digital photographing apparatus including a touch screen to which a touch input is applied by a user, the method includes: recognizing the touch input by the user in a photographing mode; setting a photographing condition by the recognized touch input; and performing a photographing, wherein the setting a photographing condition includes performing a plurality of auto focuses with time intervals, by which a focus change due to shaking occurring in the touch type photographing may be addressed.

17 Claims, 6 Drawing Sheets

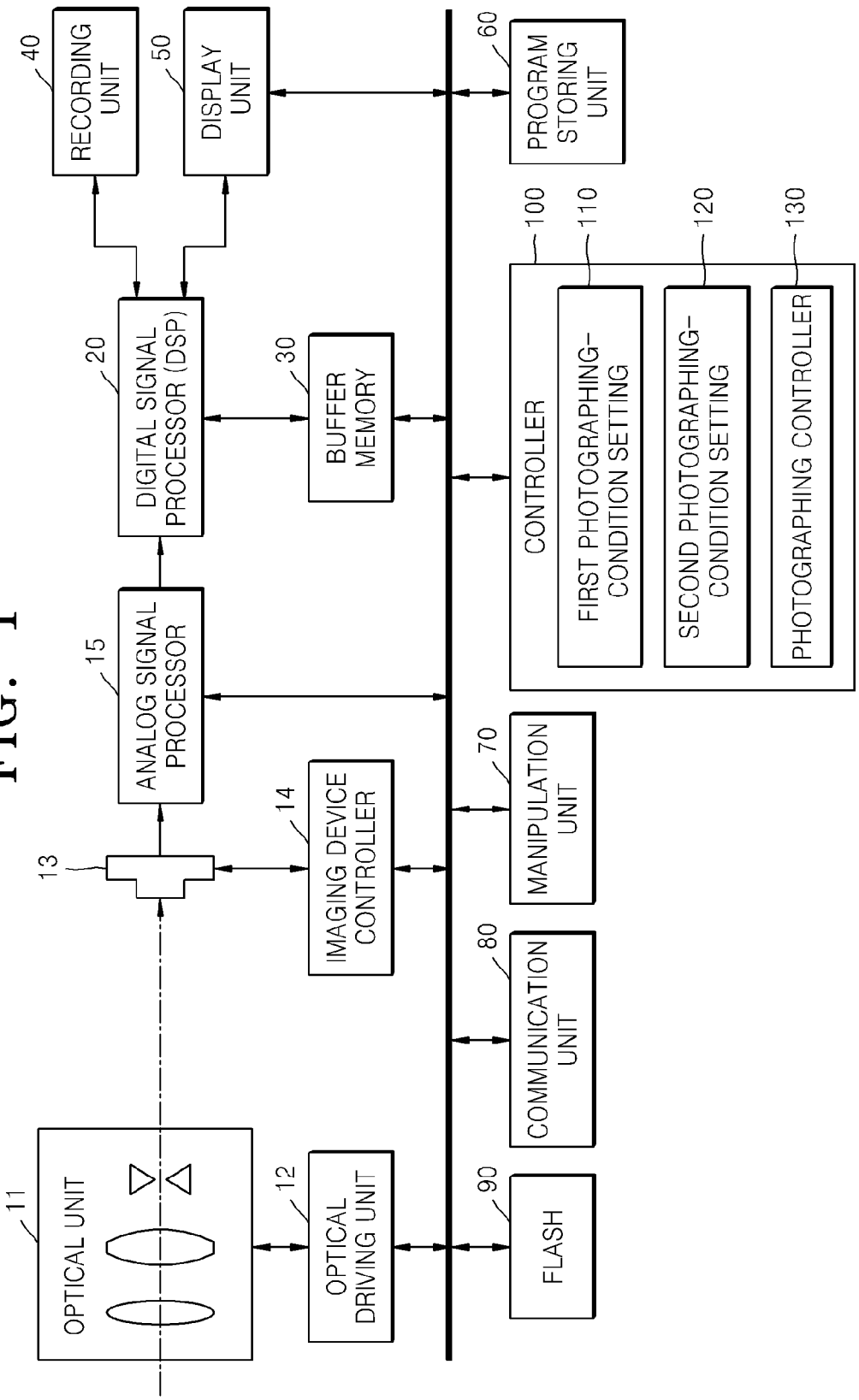

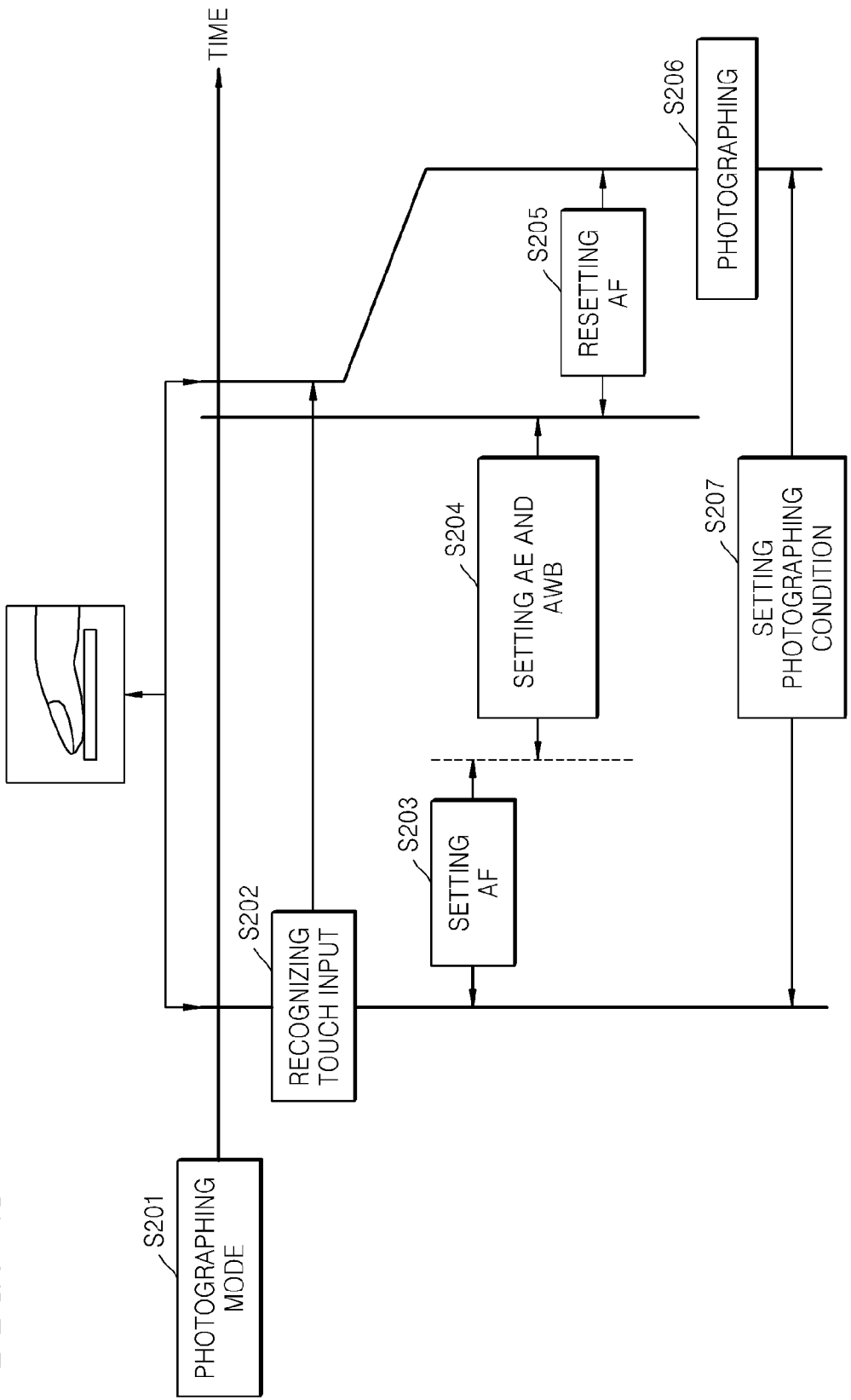

DIGITAL PHOTOGRAPHING APPARATUS, METHOD FOR CONTROLLING THE SAME, AND RECORDING MEDIUM STORING PROGRAM TO EXECUTE THE METHOD

CROSS-REFERENCE TO RELATED PATENT APPLICATION

This application claims the benefit of Korean Patent Application No. 10-2009-0112185, filed on Nov. 19, 2009, in the Korean Intellectual Property Office, the disclosure of which is incorporated herein in its entirety by reference.

BACKGROUND

The invention relates to a digital photographing apparatus, a method of controlling the same, and a recording medium storing a program to execute the method, and more particularly, to a digital photographing apparatus including a touch screen.

As digital photographing apparatuses are developed, attempts have been made to apply new hardware and software thereto. For example, a touch recognition technique has been applied to a digital photographing apparatus. Such touch recognition technique is applied to perform a variety of operations of a digital photographing apparatus. However, the shaking of a digital photographing apparatus or the change of focus while performing a photographing due to the user's touch need to be addressed.

SUMMARY

Various embodiments of the invention provide a digital photographing apparatus including a touch screen in which a focus change due to shaking caused by a touch input while photographing is adjusted, a method of controlling the same, and a recording medium storing a program to execute the method.

According to an embodiment of the invention, there is provided a method of controlling a digital photographing apparatus including a touch screen to which a touch input is applied by a user, the method including: recognizing the touch input by the user in a photographing mode; setting a photographing condition by the recognized touch input; and performing a photographing, wherein the setting a photographing condition includes performing a plurality of auto focuses with time intervals.

The touch input may be a long touch that is continuously maintained until the photographing is performed.

The touch input may be a tap touch, and the method may further include recognizing a touch input requesting a photographing before performing the photographing.

The setting of a photographing condition may include setting an auto focus, setting an auto exposure and an auto white balance, and resetting an auto focus right before performing the photographing.

According to another embodiment of the invention, there is provided a method of controlling a digital photographing apparatus including a touch screen to which a touch input is applied by a user, the method including: recognizing the touch input by the user in a photographing mode; setting a first photographing condition by the touch input; and setting a second photographing condition after setting the first photographing condition; and performing a photographing right after resetting the first photographing condition.

The touch input may be a long touch that is continuously maintained until the photographing is performed.

The touch input may be a tap touch, and the method may further include recognizing a touch input requesting a photographing for performing the photographing before performing a photographing right after resetting the first photographing condition.

The first photographing condition may be set by setting an auto focus on a subject.

The second photographing condition may be set by setting an auto exposure and an auto white balance.

According to another embodiment of the invention, there is provided a non-transitory computer program product, comprising a computer usable medium having a computer readable program code embodied therein, said computer readable program code adapted to be executed to implement the methods.

According to another aspect of the present invention, there is provided a digital photographing apparatus including: a touch screen to which a touch input by a user is applied in a photographing mode; and a controller that sets a first photographing condition by the touch input by the user, sets a second photographing condition after setting the first photographing condition, and performs a photographing right after resetting the first photographing condition.

The controller may include: a first photographing-condition setting unit for setting the first photographing condition by the touch input by the user and resetting the first photographing condition after setting the second photographing condition; a second photographing-condition setting unit for setting the second photographing condition after setting the first photographing condition; and a photographing controller for performing a photographing right after resetting the first photographing condition.

The touch input may be a long touch that is continuously maintained until the photographing is performed.

The touch input may be a tap touch, and the controller may recognize the touch input requesting a photographing, and perform a photographing right after resetting the first photographing condition by the touch input requesting a photographing.

The first photographing condition may be set by setting an auto focus on a subject.

The second photographing condition may be set by setting an auto exposure and an auto white balance.

BRIEF DESCRIPTION OF THE DRAWINGS

The above and other features and advantages will become more apparent by describing in detail exemplary embodiments of the invention with reference to the attached drawings in which:

FIG. 1 is a block diagram illustrating a digital camera according to an embodiment of the present invention;

FIG. 2 is a block diagram illustrating a method of controlling a digital photographing apparatus according to an embodiment of the present invention;

DETAILED DESCRIPTION

Figure 3A:
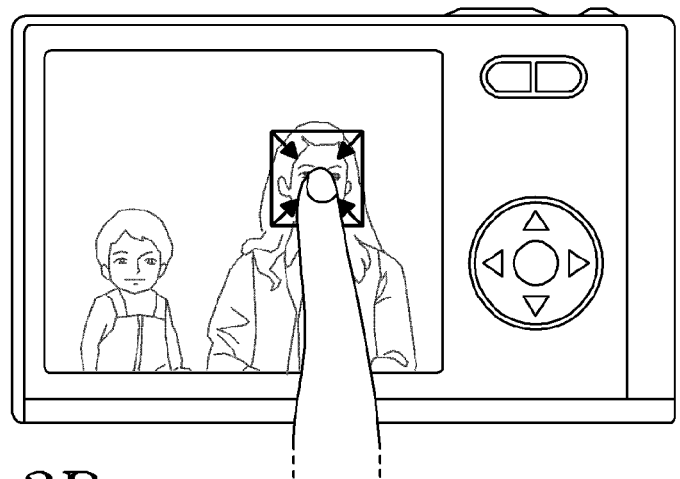
FIGS. 3A to 3C are pictorial illustrations of camera screenshots to describe a method of controlling a digital photographing apparatus according to an embodiment of the present invention.

Hereinafter, a digital photographing apparatus, a method of controlling the same, and a recording medium storing a program to execute the method will now be described more fully with reference to the accompanying drawings, in which exemplary embodiments of the invention are shown.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more central processing units (CPUs) or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar references in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the present invention.

A digital camera, that is, a digital photographing apparatus, according to an embodiment of the present invention will be described. However, the present invention is not limited thereto, and the digital photographing apparatus may also be a digital device such as a camera phone having digital photographing functions, a personal digital assistant (PDA), a portable multimedia player (PMP), a television (TV), or a digital device such as a digital picture frame, or other similar devices.

FIG. 1 is a block diagram illustrating a digital camera according to an embodiment of the present invention;

Referring to FIG. 1, the digital camera according to an embodiment of the present invention includes an optical unit 11 that inputs an optical signal from a subject, an optical driving unit 12 that drives the optical unit 11, an imaging device 13 for converting the optical signal input by the optical unit 11 into an electrical signal, an imaging device controller 14 for supplying a vertical synchronization signal to the imaging device 13, and an analog signal processor 15 that is synchronized with the vertical synchronization signal from the imaging device 13 and receives an electrical signal corresponding to a frame image to reduce noise of the electrical signal and convert the electrical signal into a digital signal. The digital camera further includes a digital signal processor (DSP) 20 for performing an image signal processing on image data provided by the analog signal processor 15. The image data may be input to the DSP 20 in real time, or may be temporarily stored in a buffer memory 30, and input to the DSP 20, if desired. The digital camera further includes a recording unit 40 for storing image data and predetermined information and a display unit 50 for displaying an image. The digital camera may also include a program storing unit 60 for storing a program related to an operation of the digital camera, a manipulation unit 70 that inputs a manipulation signal by a user, a communication unit 80 that receives and sends information from or to an external server or terminal, and a flash 90 for providing light. The digital camera further includes a controller 100 for controlling each of the elements of the digital camera according to the manipulation signal by the user or the input image.

In FIG. 1, each element of the digital camera according to the present embodiment is shown as an independent block; however the digital camera is not limited thereto, and at least two of the elements of the digital camera may constitute a single chip. In addition, an element having at least two functions may be separated into two or more chips.

Hereinafter, each of the elements of the digital camera will be described in more detail.

The optical unit 11 may include a lens unit condensing the optical signal, an iris diaphragm adjusting the quantity of the optical signal (amount of light), and a shutter controlling the inputting of the optical signal. The lens unit includes a zoom lens for widening or narrowing an angle of view according to a focal length and a focus lens for focusing on the object. The lens unit may include one zoom lens or focusing lens, or a plurality of lenses. The shutter may be a mechanical shutter that controls the incidence of light by moving up and down. Alternatively, instead of an additional shutter, providing of an electrical signal to the imaging device 13 may be controlled so as to function as the shutter.

The optical driving unit 12 for driving the optical unit 11 may adjust the position of the lens unit, open and close of the iris diaphragm, and drive the shutter so as to perform automatic focusing, automatic exposure correction, iris diaphragm control, zoom changing, and focus changing. The optical driving unit 12 controls the driving of the optical unit 11 according to a control signal received from the controller 100.

The imaging device 13 forms an image of the subject according to the optical signal input by the optical unit 11. The imaging device 13 may be a complementary metal-oxide semiconductor (CMOS) sensor array, a charge-coupled device (CCD) sensor array, or similar device. The imaging device 13 may provide image data corresponding to an image of a frame according to a timing signal supplied by the imaging device controller 14.

The analog signal processor 15 may include an analog-to-digital (A/D) converter for converting the electrical signal, which is an analog signal, supplied by the imaging device 13 into a digital signal to form the image data. The analog signal processor 15 may also include a circuit for performing signal processing such as gain control or waveform shaping on the electrical signal provided from the imaging device 13.

The DSP 20 may perform image signal processing for improving the quality of an image, such as noise reduction in input image data, gamma correction, color filter array interpolation, color matrix, color correction, and color enhancement. In addition, the DSP 20 may generate an image file by compressing the image data that is generated during the image signal processing for improving the quality of an image, or decompress the image data from the image file. The image data is compressed in a reversible or a non-reversible format. As an example of an appropriate format for compressing the image data, the image data may be converted into a join photographing experts group (JPEG) format such as JPEG 2000. The compressed image file may be stored in the recording unit 40.

The DSP 20 may also perform unclearness processing, color processing, blur processing, edge emphasis processing, image interpretation processing, image recognition processing, image effect processing, etc. The image recognition processing may include face recognition processing, scene recognition processing, or the like. The DSP 20 may also perform display image signal processing so as to display the operating state of the digital camera or information about an image captured by the digital camera on the display unit 50. For example, the DSP 20 may perform brightness level adjustment, color correction, contrast adjustment, contour emphasis adjustment, screen division processing, character image generation, and image synthesis processing.

The image data supplied by the analog signal processor 15 may be transmitted to the DSP 20 in real time, or may be temporarily stored in the buffer memory 30 and supplied to the DSP 20 if the transmission rate of the image data is different from a processing speed of the DSP 20. The buffer memory 30 may be a synchronous dynamic random-access memory (SDRAM), a multichip package (MCP) memory, a dynamic random-access memory (DRAM), or the like.

The image data that is image signal processed by the DSP 20 may be stored in the recording unit 40 or transmitted to the display unit 50 to form a predetermined image. The recording unit 40 may be a synchronous dynamic card (SDcard), a multi media card (MMC), a hard disk drive (HDD), an optical disk, a magneto-optical disk, a hologram memory, or the like.

The display unit 50 displays an image using the image data that is image signal processed by the DSP 20. In this regard, the display unit 50 may be a touch screen that recognizes the touch input by the user. The touch screen may be additionally installed on a surface of a display device such as a liquid crystal display (LCD), an organic light emitting diode (OLED) display, and a plasma display panel (PDP), or embedded in the display device. The touch screen may be driven by various methods such as a capacitive method, a resistive overlay type method, and a photo-sensing method.

The program storing unit 60 may store an operating system (OS) for operating the digital camera, applications, and the like. The program storing unit 60 may be an electrically erasable read only memory (E2PROM), a flash memory, a read-only memory (ROM), or the like.

The manipulation unit 70 may include a unit for performing settings required when a user manipulates the digital camera or photographing is performed. For example, the manipulation unit 70 may be buttons, keys, or dials and may input a user control signal used in power on/off, photographing start/stop, playback start/stop/search, driving of an optical system, mode conversion, menu manipulation, and optional manipulation.

The communication unit 80 may send or receive information to or from an external server or terminal using a communication method such as radio-frequency identification (RFID) and wireless fidelity (Wi-Fi).

The flash 90 may automatically operate by determining the exposure information of the input image, or manually operate by the user's manipulation. The flash 90 supplies light for photographing when the exposure is not sufficient or a special effect is required.

The controller 100 may control each element of the digital camera according to the program stored in the program storing unit 60. Alternatively, the controller 100 may control each element of the digital camera according to the manipulation signal input by the user via the manipulation unit 70, the input image, the result of image signal processing by the DSP 20, or the like. In addition, the controller 100 may control each element of the digital camera to perform power on/off, photographing start/stop, playback start/stop/search, driving or an optical system, mode conversion, menu manipulation, and optional manipulation by recognizing the touch input applied to the touch screen by the user.

The controller 100 recognizes the touch input, sets the photographing conditions, and then controls each element of the digital camera to start photographing. In this regard, the photographing conditions may be set such that auto focus (AF) is performed several times with time intervals. In this regard, a time interval indicates a pause between an initial AF and a next AF before photographing, the pause indicates a delay time required for photographing and adjusting a photographing condition.

Specifically, the controller 100 may include a first photographing-condition setting unit 110 for setting a first photographing condition after recognizing the touch input by the user and resetting the first photographing condition after setting a second photographing condition, a second photographing-condition setting unit 120 for setting the second photographing condition after setting the first photographing condition, and a photographing controller 130 for performing a photographing right after resetting the first photographing condition.

The first photographing-condition setting unit 110 recognizes the touch input by the user, and then primarily sets an AF on a subject in the input image. In addition, the first photographing-condition setting unit 110 secondarily resets the AF on the subject when auto exposure (AE) and auto white balance (AWB), i.e., the second photographing condition, are set. In this regard, if a new touch input is applied to the touch screen and the controller 100 recognizes the touch input, the AF may be reset even though the second photographing condition is set according to the type of the touch input.

The second photographing-condition setting unit 120 sets the second photographing condition such as AE and AWB after the first photographing-condition setting unit 110 primarily sets the auto focus.

The photographing controller 130 performs a photographing after the first photographing-condition setting unit 110 secondarily resets the AF on the subject. In other words, the AF is reset before performing the photographing.

Hereinafter, the operation of the controller 100 for controlling the photographing will be described in detail with reference to methods of controlling a digital photographing apparatus, according to embodiments of the present invention shown in FIGS. 2 to 6C.

FIG. 2 is a diagram illustrating a method of controlling a digital photographing apparatus, according to an embodiment of the present invention. Referring to FIG. 2, in a photographing mode S201, photographing conditions are set in operation S207 and a photographing is performed in operation S206.

Figure 3B:
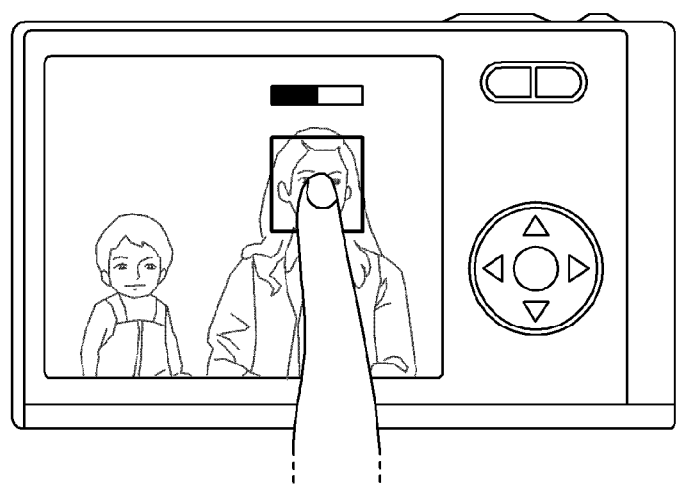
Figure 3C:
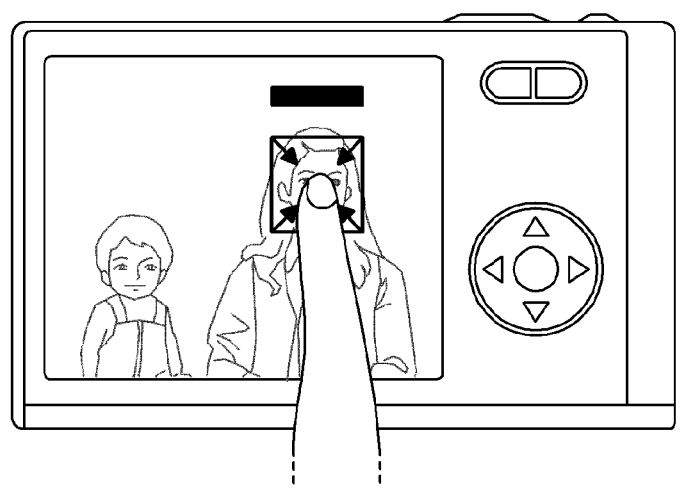

FIGS. 3A to 3C illustrate images to describe the method of controlling a digital photographing apparatus, according to the present embodiment of the present invention.

Referring to FIGS. 2 to 3C, a user prepares for photographing such that a subject is contained in a viewing angle in the photographing mode (S201).

The digital photographing apparatus recognizes a touch input by the user (S202).

Referring to FIG. 3A, the user applies the touch input to the subject of the touch screen to be auto focused and shown on the touch screen. In this regard, the digital photographing apparatus identifies the coordinates of the touch input applied to the touch screen to determine the subject to be auto focused. Here, a square mark may be formed on the subject indicated by the touch input.

Referring to FIGS. 3A to 3C, the touch input may be a long touch that is continuously maintained until the photographing is performed. In this regard, the long touch indicates an operation of contacting the touch screen with the finger for a predetermined period of time.

Referring to FIG. 3A, it is identified that the touch input is continuously maintained until the photographing is completed, after the touch input is applied to the subject to be focused.

Then, the first photographing condition is set corresponding to the touch input (S203).

According to the present embodiment, the first photographing condition is set by setting the AF on the subject.

The AF may be set using various methods according to the type of digital photographing apparatus. For example, the AF may be detected and set using the contrast of the subject. Contrast AF is a photographing method including analyzing an image formed in an imaging device, fixing a lens barrel by moving the lens barrel forward and backward in the digital photographing apparatus to a position in which a contrast value of the subject is maximized, and performing photographing. However, the AF setting method of the digital photographing apparatus according to the present embodiment is not limited thereto. The AF may be performed using a phase difference, by measuring a distance using infrared rays or ultrasonic waves, or using any known method.

Referring to FIG. 3A, it is identified that the AF is set on the subject corresponding to the touch input by the user.

When the first photographing condition is set, the second photographing condition is set (S204).

According to the present embodiment, the second photographing condition is set by setting the AE and the AWB.

The AE is performed by sensing the brightness of the subject. In order to obtain the AE, two out of the sensitivity, iris diaphragm, and shutter speed are previously set, and the other is automatically controlled according to the brightness of the subject.

The AWB is an operation to accurately express color changing according to a light source. The AWB is an operation of automatically adjusting gains of red (R), green (G), and blue (B) light such that color temperatures of a bright portion and a dark portion are the same, that is, electrically achromatic color is obtained when a white image is received. However, the present invention is not limited thereto, and various methods can be used to obtain the AWB.

Herein, the AE and AWB are described as the second photographing condition. However, the second photographing condition may also include any photographing condition such as exposure, illumination, the amount of light set for the photographing. In addition, the order of setting the second photographing conditions is not limited and may vary according to the purpose and state of the photographing.

Referring to FIG. 3B, a graphical user interface (GUI) showing a time period required for setting the second photographing condition may be displayed. The GUI may be shown using a progress bar; however the present invention is not limited thereto, and the GUI may also be shown using numbers or other similar display.

Then, the first photographing condition is reset (S205). That is, the first photographing condition that is AF and already set before setting the second photographing condition is reset.

Referring to FIG. 3C, the first photographing condition may be reset when the second photographing condition is set or when the long touch required for the recognition of the photographing request is satisfied after the second photographing condition is set.

The resetting of the first photographing condition is more quickly performed than the initial setting of the first photographing condition. This is because the digital camera adjusts the distance between the lens and the subject when the AF is performed. That is, the digital camera moves the lens barrel including the lens forward and backward to fix the lens barrel at a position in which the subject is focused. Thus, in the first AF, the lens barrel more widely and frequently moves to focus the subject. However, if the AF is reset, the focus is adjusted based on the settings of the first AF only when the focus is shaken by the touch input. Accordingly, the AF is performed more quickly compared to the first AF.

After the first photographing condition is reset, the photographing is performed (S206).

While the user maintains the long touch, the digital photographing apparatus moves by hand shaking of the user. While the other photographing conditions such as AE and AWB are set after the AF is performed, the focus set during the first AF is changed. In order to address these problems, the AF is only reset before photographing according to the present embodiment. Thus, the focus change due to shaking caused by the touch input using the touch screen may be adjusted.

Figure 4:
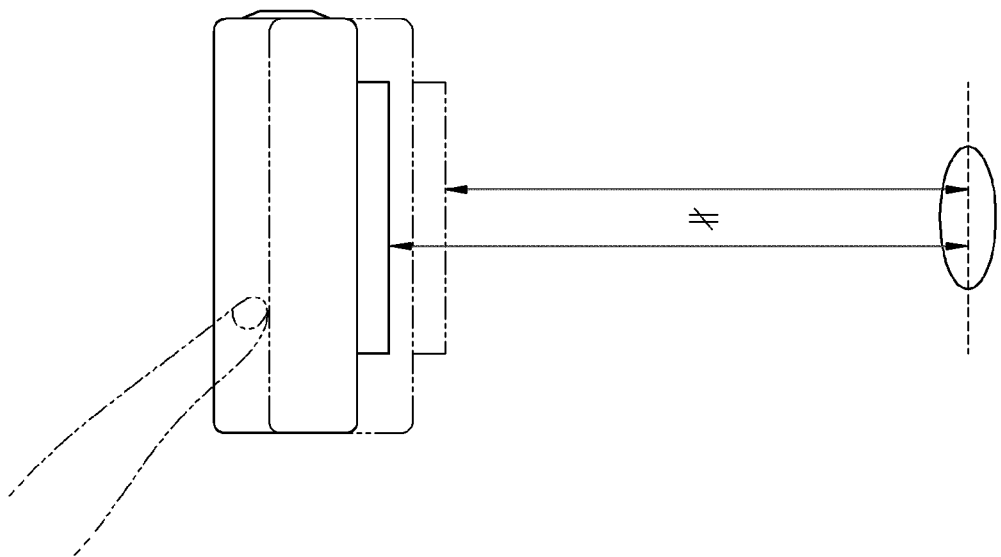
FIG. 4 is a pictorial image illustrating the change of a distance between a digital camera and a subject by touching the digital camera according to an embodiment of the present invention.

FIG. 4 illustrates the change of a distance between a digital camera and a subject by touching a digital camera, according to an embodiment of the present invention.

Referring to FIG. 4, the effect of the resetting of the AF right before performing photographing will be described.

A conventional digital camera performs photographing by pressing a shutter button disposed at the right upper portion of the digital camera. According to this type of digital camera, the distance between the digital camera and the subject is not changed or the focus is not changed at the moment of pressing the shutter. That is, the digital camera shakes up and down when the button of the right upper portion of the digital camera is pressed, but this shaking does not affect the distance between the digital camera and the subject. Thus, the previously set focus is not changed.

However, the photographing method by applying the touch input to the touch screen has the following problems. Most of the touch screens are disposed on the rear surface of the digital photographing apparatus, and the touch screen is touched when the photographing is performed. In this case, the digital camera shakes forward and backward when the touch input is applied. Referring to FIG. 4, the distance between the digital camera and the subject may be changed when the touch input is applied or while a long touch input is applied. In this case, the previously set focus on the subject is changed.

The digital photographing apparatus according to the present embodiment resets the AF right before performing the photographing, and thus the focus is not changed by the touch input. Since the focus is reset based on the initially set focus, the position of a lens barrel is slightly changed to reset the focus. Thus, the focus may be quickly reset.

Figure 5:
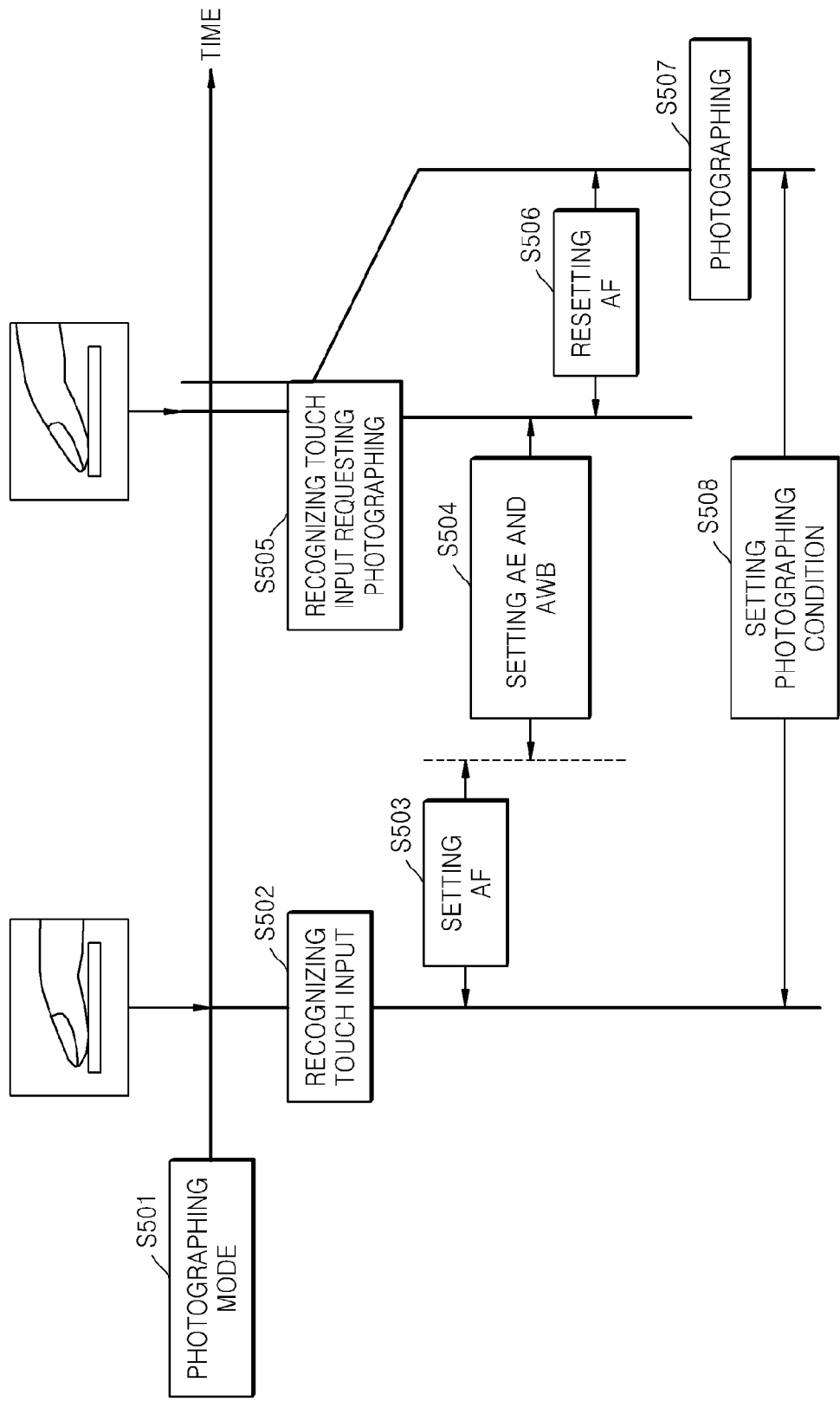
FIG. 5 is a block diagram illustrating a method of controlling a digital photographing apparatus according to another embodiment of the present invention.

FIG. 5 is a diagram illustrating a method of controlling a digital photographing apparatus, according to another embodiment of the present invention. Referring to FIG. 5, in a photographing mode S501, photographing conditions are set in operation S508 and a photographing is performed in operation S507.

Figure 6A:
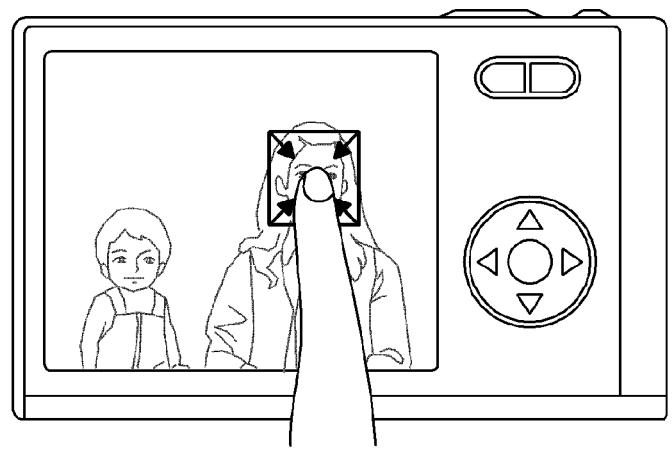
FIGS. 6A to 6C are pictorial illustrations of camera screenshots to describe a method of controlling a digital photographing apparatus according to another embodiment of the present invention.
Figure 6B:
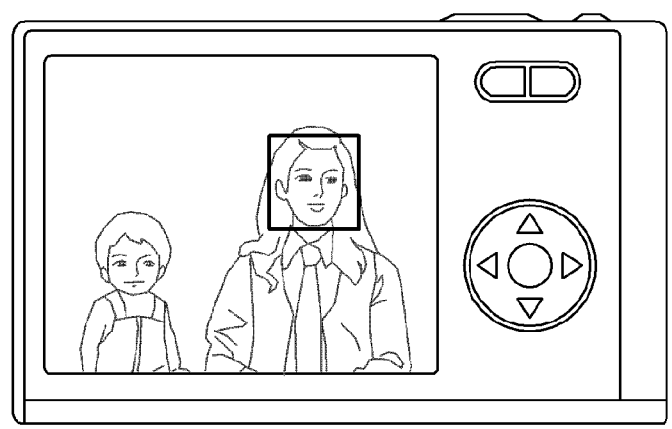
Figure 6C:
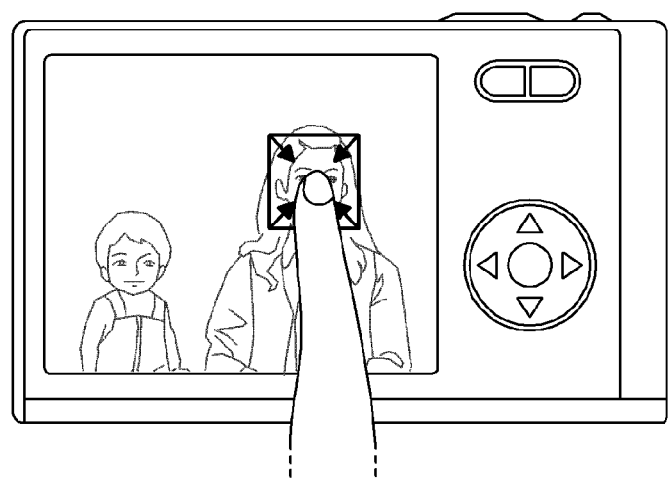

FIGS. 6A to 6C illustrate images to describe the method of controlling a digital photographing apparatus, according to the present embodiment of the present invention.

The type of touch and number of touches to perform photographing are different between the method of the present embodiment described with reference to FIGS. 5, and 6A to 6C and the method of the previous embodiment described with reference to FIGS. 2, and 3A to 3C. Hereinafter, the difference will be described in more detail, and the same operations will not be described.

Referring to FIGS. 5 to 6C, a user prepares for photographing such that a subject is contained in a viewing angle in the photographing mode (S501).

The digital photographing apparatus recognizes a touch input (S502).

Referring to FIG. 6A, the touch input may be a tap touch. In this regard, the tap touch indicates a tapping operation of attaching a finger to the touch screen for a short period of time and detaching the finger from the touch screen.

Then, the first photographing condition is set corresponding to the touch input (S503).

According to the present embodiment, the first photographing condition is set by set the AF on the subject.

Referring to FIG. 6A, it is identified that the AF is set on the subject corresponding to the touch input by the user.

When the first photographing condition is set, the second photographing condition is set (S504).

According to the present embodiment, the second photographing condition is set by setting the AE and the AWB In this regard, the AE and AWB are described as the second photographing condition. However, the second photographing condition may also include any photographing condition such as exposure, illumination, and the amount of light set for the photographing. In addition, the order of setting the second photographing conditions is not limited and may vary according to the purpose and state of the photographing.

Referring to FIG. 6B, a GUI showing a time period required for setting the second photographing condition may be displayed.

Then, the digital photographing apparatus recognizes a touch input requesting a photographing for performing the photographing.

In this regard, the touch input requesting a photographing may be a tap touch as in operation S502; however, the touch input is not limited thereto, and the touch input requesting a photographing may be a long touch. In this regard, the long touch may continuously be performed until the photographing is completed.

Then, the first photographing condition is reset corresponding to the touch input requesting a photographing (S506). That is, if a touch input requesting a photographing is recognized as shown in FIG. 6C, the photographing is not immediately performed, but the AF is reset.

The resetting of the first photographing condition is more quickly performed than the initial setting of the first photographing condition. This is because if the AF is reset, the focus is adjusted based on the settings of the first AF only when the focus is changed by the touch input.

After the first photographing condition is reset, the photographing is performed (S507).

If a tap touch is applied again for requesting the photographing, the digital camera is moved by the tap touch. Thus, the previously set focus on the subject changes. In order to address these problems, the AF is only reset before photographing according to the present embodiment. Thus, the focus change due to shaking caused by the touch input to the touch screen may be adjusted.

Accordingly, the focus change due to shaking caused by the touch input when performing photographing may be addressed, and an accurate AF may be performed.

The present invention can also be embodied as computer readable code on a computer readable recording medium. The computer readable recording medium is any data storage device that can store data which can be thereafter read by a computer system.

Examples of the computer readable recording medium include a magnetic storage medium such as read-only memory (ROM), random-access memory (RAM), floppy disks, and hard disks, and an optical data storage device such as CD-ROM and digital versatile disc (DVD). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus comprising a touch screen to which a touch input is applied by a user, the method comprising:
   recognizing the touch input by the user in a photographing mode;
   setting a photographing condition by the recognized touch input; and
   performing a photographing,
   wherein the setting of a photographing condition comprises:
      performing a first auto focus operation;
      performing a second auto focus operation based on the settings of the first auto focus operation,
      wherein the second auto focus operation is performed at a predetermined time after the start of a long touch input; and
      displaying a graphical user interface on the touch screen to indicate a time remaining between the start of the long touch input and the setting of the photographing condition.

2. The method of claim 1, wherein the touch input is a long touch that is continuously maintained until the photographing is performed.

3. The method of claim 1, wherein the touch input is a tap touch, and the method further comprises recognizing a touch input requesting a photographing before performing the photographing.

4. The method of claim 1, wherein the setting of a photographing condition comprises setting an auto focus, setting an auto exposure and an auto white balance, and the resetting an auto focus right before performing the photographing.

5. A method of controlling a digital photographing apparatus comprising a touch screen to which a touch input is applied by a user, the method comprising:
   recognizing the touch input by the user in a photographing mode;
   setting a first photographing condition by the touch input;
   setting a second photographing condition after setting the first photographing condition; and
   performing a photographing right after resetting the first photographing condition,
   wherein setting first and second photographing conditions comprises:
      performing a first auto focus operation;
      performing a second auto focus operation based on the settings of the first auto focus operation,
      wherein the second auto focus operation is performed at a predetermined time after the start of a long touch input; and
      displaying a graphical user interface on the touch screen to indicate a time remaining between the start of the long touch input and the setting of the photographing condition.

6. The method of claim 5, wherein the touch input is a long touch that is continuously maintained until the photographing is performed.

7. The method of claim 5, wherein the touch input is a tap touch, and the method further comprises recognizing a touch input requesting a photographing for performing the photographing before performing a photographing right after resetting the first photographing condition.

8. The method of claim 5, wherein the first photographing condition is set by setting an auto focus on a subject.

9. The method of claim 5, wherein the second photographing condition is set by setting an auto exposure and an auto white balance.

10. A non-transitory computer program product, comprising a computer usable medium having a computer readable program code embodied therein, said computer readable program code adapted to be executed to implement the method according to claim 1.

11. A non-transitory computer program product, comprising a computer usable medium having a computer readable program code embodied therein, said computer readable program code adapted to be executed to implement the method according to claim 5.

12. A digital photographing apparatus comprising:
   a touch screen to which a touch input by a user is applied in a photographing mode; and
   a controller that sets a first photographing condition by the touch input by the user, sets a second photographing condition after setting the first photographing condition, and performs a photographing right after resetting the first photographing condition,
   wherein setting first and second photographing conditions comprises:
      performing a first auto focus operation; and
      performing a second auto focus operation based on the settings of the first auto focus operation,
      wherein the second auto focus operation is performed at a predetermined time after the start of a long touch input, and
      wherein a graphical user interface displayed on the touch screen indicates a time remaining between the start of the long touch input and the setting of the photographing condition.

13. The digital photographing apparatus of claim 12, wherein the controller comprises:
   a first photographing-condition setting unit for setting the first photographing condition by the touch input by the user and resetting the first photographing condition after setting the second photographing condition;
   a second photographing-condition setting unit for setting the second photographing condition after setting the first photographing condition; and
   a photographing controller for performing a photographing right after resetting the first photographing condition.

14. The digital photographing apparatus of claim 12, wherein the touch input is a long touch that is continuously maintained until the photographing is performed.

15. The digital photographing apparatus of claim 12, wherein the touch input is a tap touch, and the controller recognizes the touch input requesting a photographing, and performs a photographing right after resetting the first photographing condition by the touch input requesting a photographing.

16. The digital photographing apparatus of claim 12, wherein the first photographing condition is set by setting an auto focus on a subject.

17. The digital photographing apparatus of claim 12, wherein the second photographing condition is set by setting an auto exposure and an auto white balance.

* * * * *